Jan. 4, 1966    R. P. FUNK    3,227,470
TRACTOR-TRAILER LOAD TRANSFERRING DEVICE
Filed July 18, 1963    2 Sheets-Sheet 1

Richard Paul Funk
INVENTOR.

Jan. 4, 1966  R. P. FUNK  3,227,470
TRACTOR-TRAILER LOAD TRANSFERRING DEVICE
Filed July 18, 1963  2 Sheets-Sheet 2
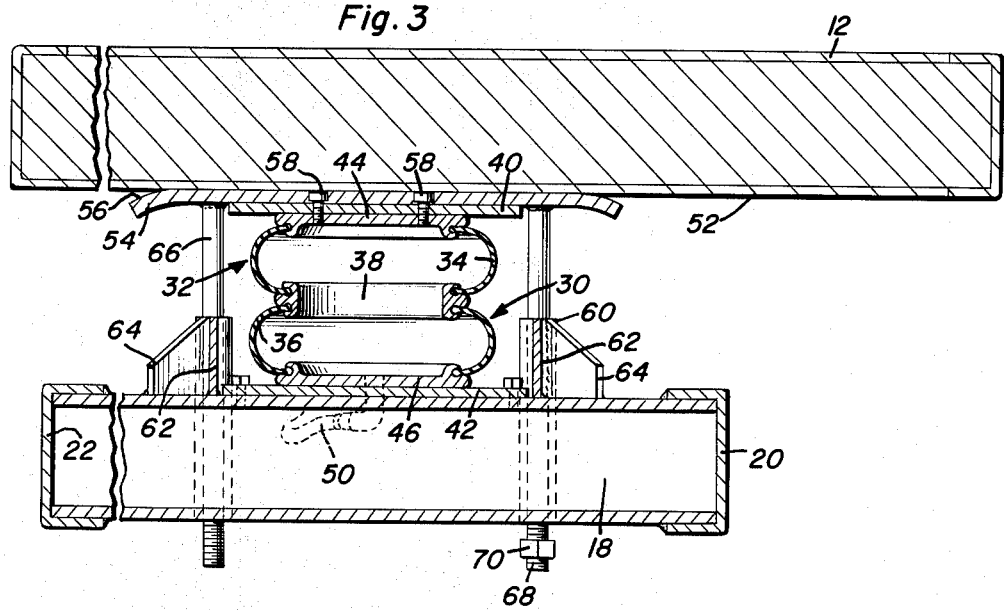
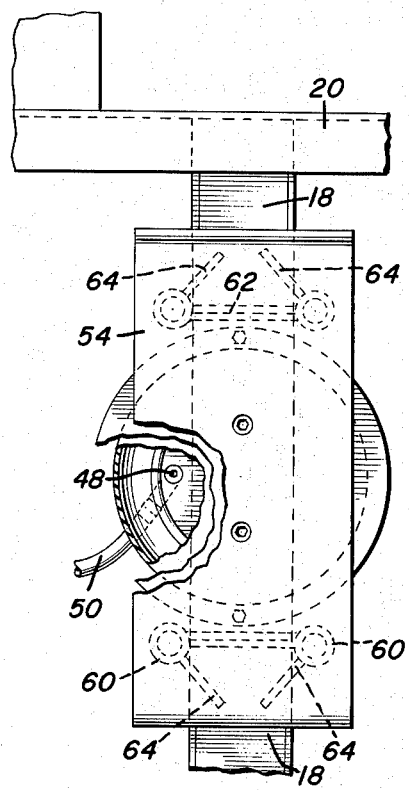
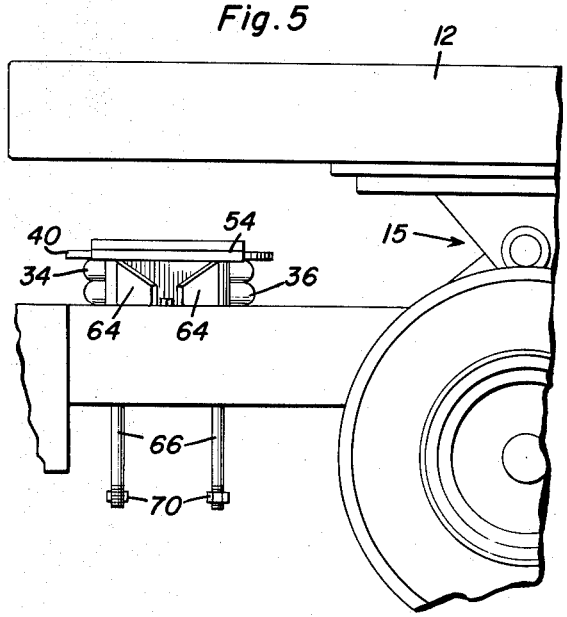
Richard Paul Funk
INVENTOR.

United States Patent Office 3,227,470
Patented Jan. 4, 1966

3,227,470
TRACTOR-TRAILER LOAD TRANSFERRING DEVICE
Richard Paul Funk, Center Road, R.R. 4, Box 198, Tiffin, Ohio
Filed July 18, 1963, Ser. No. 295,970
7 Claims. (Cl. 280—405)

This invention relates to a novel and useful tractor-trailer load transferring device and more specifically to a tractor-trailer load transferring device which may be effectively utilized to transfer some of the weight which would normally be supported by the drive wheels of the tractor to the steering wheels thereof.

In an instance where a tractor-trailer vehicle is being utilized to haul numerous lifts of steel, if the separate packages of steel are not properly positioned on the trailer section of the vehicle, too much weight might be supported from the forward end of the trailer vehicle which would therefore effect an excessive loading of the rear drive wheels of the tractor section. While it is possible in some instances to shift a part of the load, this is not always the case and the shifting of numerous heavy lifts of steel on a tractor-trailer vehicle can be time consuming and expensive.

With the load transferring device of the instant invention interposed between the overlapping portion of the tractor and trailer sections, the load transferring device may be utilized to effect an upward thrust on the forwardmost free end of the trailer section forwardly of the fifth wheel pivotal connection between the tractor and trailer sections whereby the result will be a transferring of a portion of the load supported from the rear drive wheels of the tractor section to the front steering wheels of the tractor section. While some states such as New York may allow a truck to haul up to 22,000 pounds on one axle, other states such as Michigan impose a limit of 18,000 pounds per axle. However, as long as the tractor-trailer combination is provided with a load transferring device of sufficient strength, the drive wheels of the tractor may be loaded to the limit of 22,000 pounds per axle for New York state with the same load being also legal in Michigan by the use of the load transferring device of the instant invention with which a sufficient amount of the weight of the load may be transferred from the driving wheels of the tractor to the front steering wheels thereof and also the rear wheels of the trailer section.

The main object of this invention is to provide a load transferring device construction in a manner whereby it will perform the desired function and yet be readily adaptable to usage on substantially all types of tractor-trailer combination vehicles.

Another object of this invention, in accordance with the immediately preceding object, is to provide a load transferring device which will be capable of functioning in an improved manner over previously known weight distribution mechanisms.

Still another object of this invention is to provide a load transferring device constructed in a manner whereby it may be readily operated from the cab of the tractor vehicle.

A final object of this invention to be specifically enumerated herein is to provide a tractor-trailer load transferring device which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary transverse sectional view taken substantially upon a plane passing through the longitudinal centerline of the transverse frame member to which the load transferring device is secured;

FIGURE 4 is a fragmentary top plan view taken substantially upon a plane indicated by the section line 4—4 of FIGURE 2 and with parts of the load transferring device being broken away and shown in section;

FIGURE 5 is an enlarged fragmentary side elevational view similar to that of FIGURE 2 but with the load transferring device being shown in the inoperative position.

Figure 1:
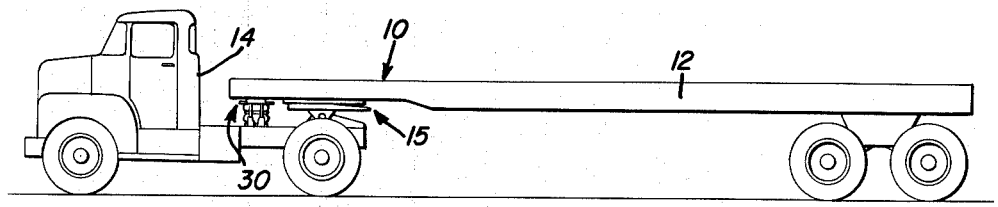
FIGURE 1 is a side elevational view of a conventional form of tractor-trailer vehicle shown with the load-transferring device of the instant invention operatively connected between the tractor and trailer sections of the vehicle.

With attention now directed more specifically to the drawings, the numeral 10 generally designates a conventional form of tractor-trailer vehicle combination including a trailer section 12 and a tractor section 14. A conventional fifth wheel assembly generally referred to by the reference numeral 15 is utilized to pivotally secure the forward end of the trailer section 12 to the rear end of the tractor section 14 and it can be seen from FIGURE 2 of the drawings that the front end of the trailer section 12 overlaps the rear end of the tractor section 14.

The tractor section 14 includes a transverse brace member 18 which is conventional and extends between the side rails 20 and 22 of the frame of the tractor section 14. However, the transverse brace member 18 has been reinforced by means of a pair of steel plates 24 and 26 welded along the opposite sides of the I-beam defined by the transverse frame member 18.

The load transferring device of the instant invention is generally designated by the reference numeral 30 and includes a vertically expandable and upright fluid bag assembly generally referred to by the reference numeral 32. The bag assembly 32 includes a pair of flexible annular sections 34 and 36 which are interconnected by means of a connecting ring 38 and are secured to upper and lower mounting plates 40 and 42 by means of a pair of opposite end members 44 and 46.

The end member 46 has an inlet opening 48 formed therein with which the outlet end of an air supply line 50 is communicated. It is to be noted that the air supply line 50 may be operatively connected to a suitable source of fluid under pressure and that suitable control means (not shown) may be utilized to admit fluid under pressure into the fluid bag assembly 32 and to vent the interior of the latter to the ambient atmosphere or a reservoir of a pressurized fluid.

The trailer section 12 includes a lower surface 52 and a bearing plate 54 is supported from the brace member or frame member 18 and includes an upper surface 56 which, together with the undersurface 52, defines coacting antifriction bearing means. The bearing plate 54 is secured to the mounting plate 40 in any convenient manner such as by fasteners 58 which secure both the bearing plate 64 and the mounting plate 40 to the end member or plate 44.

The load transferring assembly 30 also includes guide means in the form of two pairs of guide tubes 60 which are secured to the plates 24 and 26 at points spaced longitudinally along the frame member 18 and with the guide tubes of each pair of tubes disposed on opposite sides of the frame member 18. The guide tubes 60 project above the upper surface of the transverse frame member 18 and the tubes 60 of each pair of tubes are rigidly interconnected by means of upstanding webs 62 secured therebetween and to the upper surface of the frame member 18. In addition, each of the tubes 60 also includes another reinforcing web 64 which is secured thereto and to the upper surface of the frame member 18 and extends diagonally thereacross.

The bearing plate 54 has two pairs of depending guide rods 66 secured thereto and it will be noted that the rods 66 are snugly and slidably received in the tubes 60 and that their lower ends are externally threaded as at 68 and have removable abutments 70 threadedly engaged therewith. The abutments 70 are provided to prevent complete withdrawal of the rods 66 from the tubes 60 and it will be noted that the positioning of the abutments 70 along the rods 66 may be adjusted as desired.

The guide rods 66 are provided to assure that the upper mounting plate 40 will move only toward and away from the lower mounting plate 42 and that substantially all deflection of the bearing plate 54 laterally of the tubes 60 will be eliminated.

In operation, the load transferring assembly is secured to the transverse frame or brace member 18 in the manner hereinbefore set forth. Then, with the controls provided the driver of the tractor section 14, the driver may extend the fluid bag means to the position illustrated in FIGURE 2 of the drawings in order to bring the bearing plate 54 into sliding contacting relation with the lower surface 52 of the trailer section 12. In addition, the driver of the tractor section 14 may manipulate the control (not shown) for venting the interior of the fluid bag means and enabling the weight of the rods 66, the upper end of the fluid bag assembly 32 and the bearing plate 54 to lower the load transferring assembly to the inoperative position illustrated in FIGURE 5 of the drawings.

Figure 2:
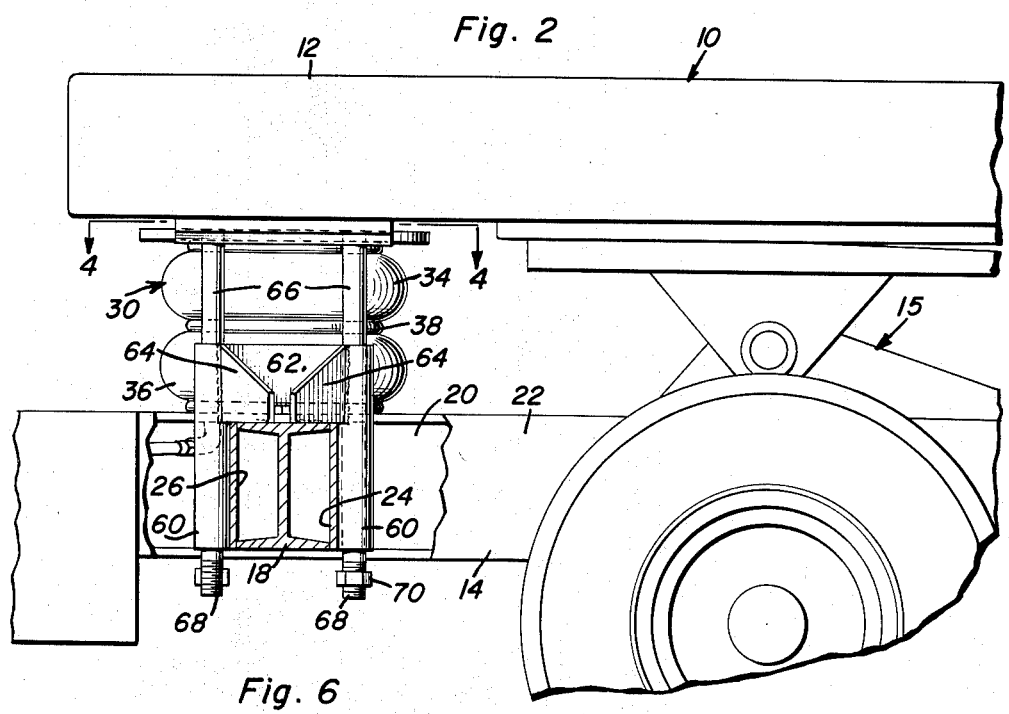
FIGURE 2 is an enlarged fragmentary side elevational view of the overlapped portions of the tractor-trailer vehicle and with portions of the tractor section being broken away and shown in section to more clearly illustrate the manner in which the load-transferring device is secured to the tractor section.
Figure 6:
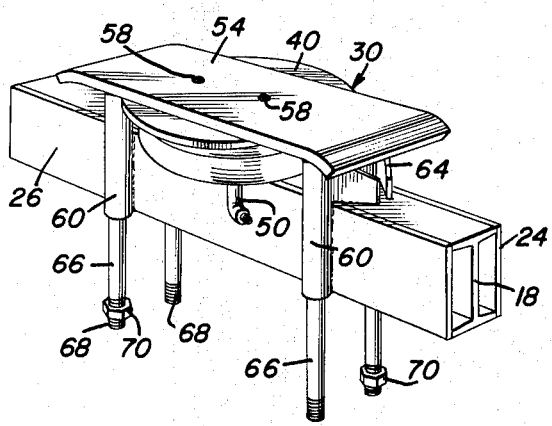
FIGURE 6 is a view in perspective showing the load-transferring device of the instant invention mounted on the transverse brace member of the tractor frame.

Upon movement of the bearing plate 50 from the lowered position in FIGURE 5 of the drawings to the extended positions illustrated in FIGURES 2 and 3 of the drawings, the upward force effected upon the forward end portion of the trailer section 12 will have an effect of reducing the weight supported by the rear wheels of the tractor section 14 and increasing the weight of the load on the trailer section wheels and the front steering wheels of the tractor section 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a tractor trailer combination having a tractor section and a trailer section with a fifth wheel pivotal connection between the tractor and trailer sections thereof and in which the front end portion of the trailer section overlaps the rear end of the tractor section and terminates at its forward end a spaced distance forwardly of said fifth wheel pivotal connection, a load transferring assembly including vertically expandable upright fluid bag means, the upper and lower ends of said bag means having mounting plates secured thereto, means securing one of said mounting plates to one of said sections with said fluid bag means disposed between the overlapped portions of said sections forwardly of said fifth wheel pivotal connection, the other of said sections and the other mounting plate defining coacting antifriction bearing means, coacting guide means supported from said other mounting plate and said one section guidingly engaged with each other and guiding the movement of said other mounting plate to that of movement toward and away from said one mounting plate, said one section including an elongated transverse frame member, said one plate being secured to said frame member, said coacting guide means comprising two pairs of upstanding parallel guide tubes fixedly secured to said frame member at points spaced longitudinally along the latter with said fluid bag means disposed therebetween and the guide tubes of each pair of tubes disposed on opposite sides of said frame member, and two pairs of depending guide rods fixedly supported at their upper ends from said other mounting plate and having their lower ends snugly and telescopingly received in said guide tubes.

2. The combination of claim 1 wherein said guide rolls project down through said guide tubes and are provided with abutments on their lower end portions engageable with the lower ends of the corresponding tubes to prevent withdrawal of said rods from said tubes.

3. In a tractor trailer combination having a tractor section and a trailer section with a fifth wheel pivotal connection between the tractor and trailer sections thereof and in which the front end portions of the trailer section overlaps the rear end of the tractor section and terminates at its forward end a spaced distance forwardly of said fifth wheel pivotal connection, a load transferring assembly including vertically expandable upright fluid bag means, the upper and lower ends of said bag means having mounting plates secured thereto, means securing one of said mounting plates to one of said sections with said fluid bag means disposed between the overlapped portions of said sections forwardly of said fifth wheel pivotal connection, the other of said sections and the other mounting plate defining coacting antifriction bearing means, and coacting guide means supported from said other mounting plate and said one section guidingly engaged with each other and guiding the movement of said other mounting plate to that of movement toward and away from said one mounting plate, said one section comprising said tractor, said tractor including an elongated transverse frame member, said one plate being secured to said frame member, said fluid bag means projecting to the front and rear of said frame member, said coacting guide means comprising two pairs of upstanding parallel guide tubes fixedly secured to said frame member at points spaced longitudinally along the latter with said fluid bag means disposed therebetween and the guide tubes of each pair of tubes disposed on opposite sides of said frame member, and two pairs of depending guide rods fixedly supported at their upper ends from said other mounting plate and having their lower ends snugly and telescopingly received in said guide tubes, said tubes projecting above said frame member and the tubes of each pair of tubes being rigidly interconnected by means of an upstanding web secured therebetween and to said frame member.

4. The combination of claim 3 wherein said tubes each include an additional upstanding bracing web secured thereto and to said frame member which extends diagonally across the latter.

5. The combination of claim 4 wherein said guide rods project down through said guide tubes and are provided with abutments on their lower end portions engageable with the lower ends of the corresponding tubes to prevent withdrawal of said rods from said tubes.

6. In a tractor trailer combination having a tractor section and a trailer section with a fifth wheel pivotal connection between the tractor and trailer sections thereof and in which the front end portion of the trailer section overlaps the rear end of the tractor section and terminates at its forward end a spaced distance forwardly of said fifth wheel pivotal connection, a load transferring assembly including vertically expandable upright fluid bag means, the upper and lower ends of said bag means having mounting plates secured thereto, means securing one of said mounting plates to one of said sections with said fluid bag means disposed between the overlapped portions of said sections forwardly of said fifth wheel pivotal connection, the other of said sections and the other mounting plate defining coacting antifriction bearing means, and coacting guide means supported from said other mounting plate and said one section guidingly engaged with each other and guiding the movement of said other mounting plate to that of movement toward and away from said one mounting plate, said one section comprising said tractor, said tractor including an elongated transverse frame member, said one plate being secured to said frame member, said fluid bag means projecting to the front and rear of said frame member, said coacting guide means comprising two pairs of upstanding parallel guide tubes fixedly secured to said frame member at points spaced longitudinally along the latter with said fluid bag means disposed therebetween and the guide tubes of each pair of tubes disposed on opposite sides of said frame member, and two pairs of depending guide rods fixedly supported at their upper ends from said other mounting plate and having their lower ends snugly and telescopingly received in said guide tubes, said load transferring assembly being supported from said tractor completely independently of said fifth wheel pivotal connection.

7. For use with a tractor-trailer combination having a tractor section and a trailer section with a fifth wheel pivotal connection between the tractor and trailer sections thereof and in which the front end portion of the trailer overlaps the rear end of the tractor section and terminates at its forward end a spaced distance forwardly of said fifth wheel pivotal connection, a load transferring assembly including vertically expandable upright fluid bag means, a transverse frame member adapted to be secured to said tractor section forwardly of said pivotal connection, the lower end of said bag means being secured to said transverse frame member with said bag means projecting upwardly therefrom, a bearing plate secured to the upper end of said fluid bag means and including upwardly facing bearing surface means adapted to bear against a similar bearing plate secured to the under portion of said trailer section forwardly of said fifth wheel pivotal connection, coacting guide means supported from the first-mentioned bearing plate and said transverse frame member guidingly engaged with each other and guiding the movement of said first mentioned bearing plate through that of movement toward and away from said transverse frame member, said coacting guide means comprising two pairs of upstanding parallel guide tubes fixedly secured to said frame member at points spaced longitudinally along the latter with said fluid guide means disposed therebetween and the guide tubes of each pair of tubes disposed on opposite sides of said frame member, and two pairs of depending guide rods fixedly supported at their upper ends from said first-mentioned bearing plate and having their lower ends snugly and telescopingly received in said guide tubes.

References Cited by the Examiner
UNITED STATES PATENTS

| | | | |
|---|---|---|---|
| 2,821,409 | 1/1958 | Chalmers | 280—440 |
| 2,941,818 | 6/1960 | Hubbard | 280—405 |
| 2,996,312 | 8/1961 | Paul | 280—406 |
| 2,999,681 | 9/1961 | Muller | 267—65 |
| 3,136,566 | 6/1964 | Harding | 280—405 |

BENJAMIN HERSH, *Primary Examiner.*

LEO FRIAGLIA, *Examiner.*